US011053015B2

(12) United States Patent
Tateiwa

(10) Patent No.: US 11,053,015 B2
(45) Date of Patent: Jul. 6, 2021

(54) ENGINE PYLON HAVING A DRAIN

(71) Applicant: MITSUBISHI AIRCRAFT CORPORATION, Aichi (JP)

(72) Inventor: Jingo Tateiwa, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 600 days.

(21) Appl. No.: 14/629,736

(22) Filed: Feb. 24, 2015

(65) Prior Publication Data
US 2015/0246731 A1 Sep. 3, 2015

(30) Foreign Application Priority Data

Feb. 28, 2014 (JP) ................ JP2014-038537

(51) Int. Cl.
*B64D 27/26* (2006.01)
*B64D 29/02* (2006.01)
(Continued)

(52) U.S. Cl.
CPC ............... *B64D 29/02* (2013.01); *B64C 7/02* (2013.01); *F02C 7/20* (2013.01);
(Continued)

(58) Field of Classification Search
CPC ........ B64D 29/02; B64D 29/00; B64D 27/26; B64D 2027/262; B64D 37/26;
(Continued)

(56) References Cited

U.S. PATENT DOCUMENTS 3,357,657 A * 12/1967 Ferrel .................... B64D 45/00
244/54
4,163,366 A * 8/1979 Kent ........................ F02C 7/25
60/226.1
(Continued)

FOREIGN PATENT DOCUMENTS

| JP | 2008524488 A | 7/2008 |
| JP | 2013-540941 A | 11/2013 |
| WO | 2012/045029 A1 | 4/2012 |

OTHER PUBLICATIONS

Office Action for Japanese Application No. 2014-038537 dated Sep. 4, 2017.

*Primary Examiner* — Medhat Badawi
*Assistant Examiner* — Vicente Rodriguez
(74) *Attorney, Agent, or Firm* — Pearne & Gordon LLP

(57) ABSTRACT

An engine pylon that is used for supporting an engine, the engine pylon including a pylon body having an upper pylon and a lower pylon. The pylon further includes a fairing that covers the pylon body such that the upper pylon and fairing define a predetermined region. Moreover, the pylon includes a first drain that is configured to discharge a flammable liquid leaking from a pipe provided within the predetermined region into outside air; and a ventilation path configured to bring the inside of the predetermined region into communication with the outside air. The first drain includes a drain port and a drain pipe, wherein the drain pipe extends in a rear direction from the drain port and has an outlet at a rear end of the drain pipe, the outlet being located past a rear end of the upper pylon and a rear end of the lower pylon.

23 Claims, 7 Drawing Sheets

(51) Int. Cl.
    *F02C 7/20*      (2006.01)
    *B64C 7/02*      (2006.01)
    *B64D 45/00*     (2006.01)
(52) U.S. Cl.
    CPC .. *B64D 2045/009* (2013.01); *F05D 2260/602* (2013.01); *F05D 2260/608* (2013.01); *Y02T 50/60* (2013.01)
(58) Field of Classification Search
    CPC . B64D 37/32; B64D 37/00; F02C 7/20; F02C 7/22; F02C 7/222; F05D 2260/602
    See application file for complete search history.

(56) References Cited

U.S. PATENT DOCUMENTS

| | | | | |
|---|---|---|---|---|
| 5,524,846 | A * | 6/1996 | Shine | B64D 27/00 244/121 |
| 5,524,847 | A * | 6/1996 | Brodell | B64C 7/02 244/54 |
| 5,782,077 | A * | 7/1998 | Porte | F02C 7/185 165/154 |
| 5,833,172 | A * | 11/1998 | Grafwallner | B64D 37/26 244/1 R |
| 2003/0213871 | A1 * | 11/2003 | Howe | B64D 37/00 244/129.1 |
| 2006/0027707 | A1 * | 2/2006 | Bonnaud | B64D 29/02 244/129.1 |
| 2008/0181770 | A1 * | 7/2008 | Russell | B64D 29/00 415/182.1 |
| 2009/0111370 | A1 | 4/2009 | Porte et al. | |
| 2011/0155847 | A1 * | 6/2011 | Journade | B64D 29/02 244/54 |
| 2012/0001019 | A1 * | 1/2012 | Morvant | B64D 29/02 244/54 |
| 2012/0104162 | A1 * | 5/2012 | West | B64C 1/1453 244/54 |
| 2012/0324907 | A1 * | 12/2012 | Waldron | B64D 29/06 60/797 |
| 2013/0221157 | A1 * | 8/2013 | Machado | B64C 7/02 244/130 |
| 2013/0327059 | A1 * | 12/2013 | Richardson | B64C 1/1453 60/797 |
| 2015/0144732 | A1 * | 5/2015 | Peyruseigt | B64C 1/0009 244/54 |
| 2015/0175272 | A1 * | 6/2015 | Brochard | B64D 45/00 244/54 |

* cited by examiner

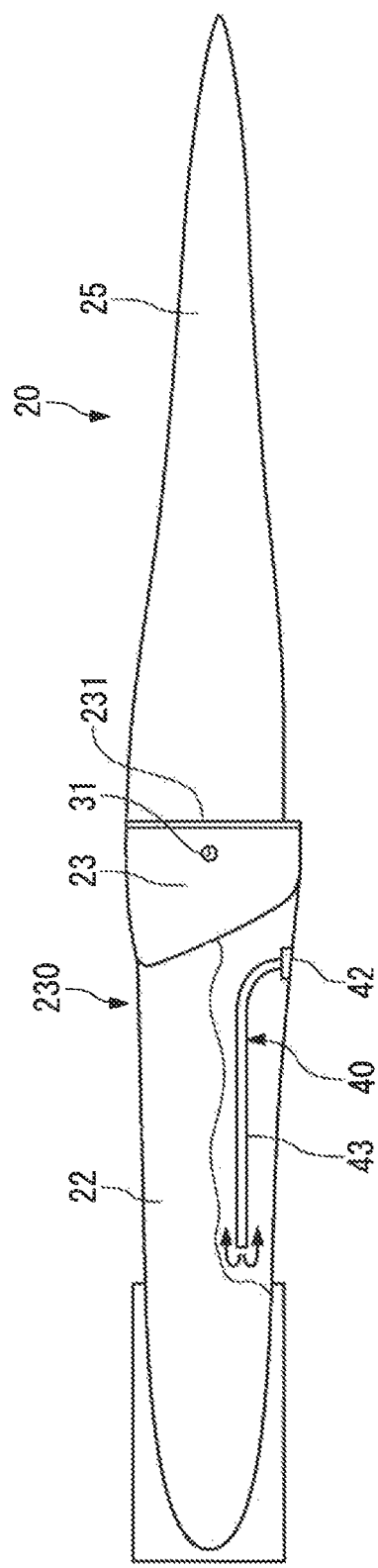
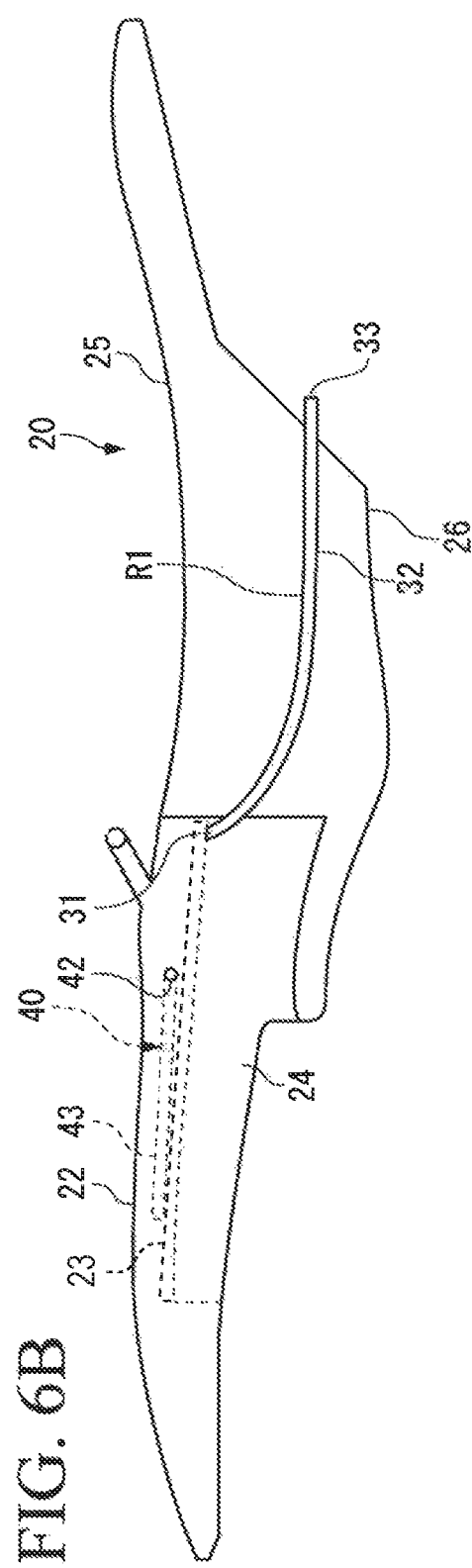
FIG. 6A
FIG. 6B

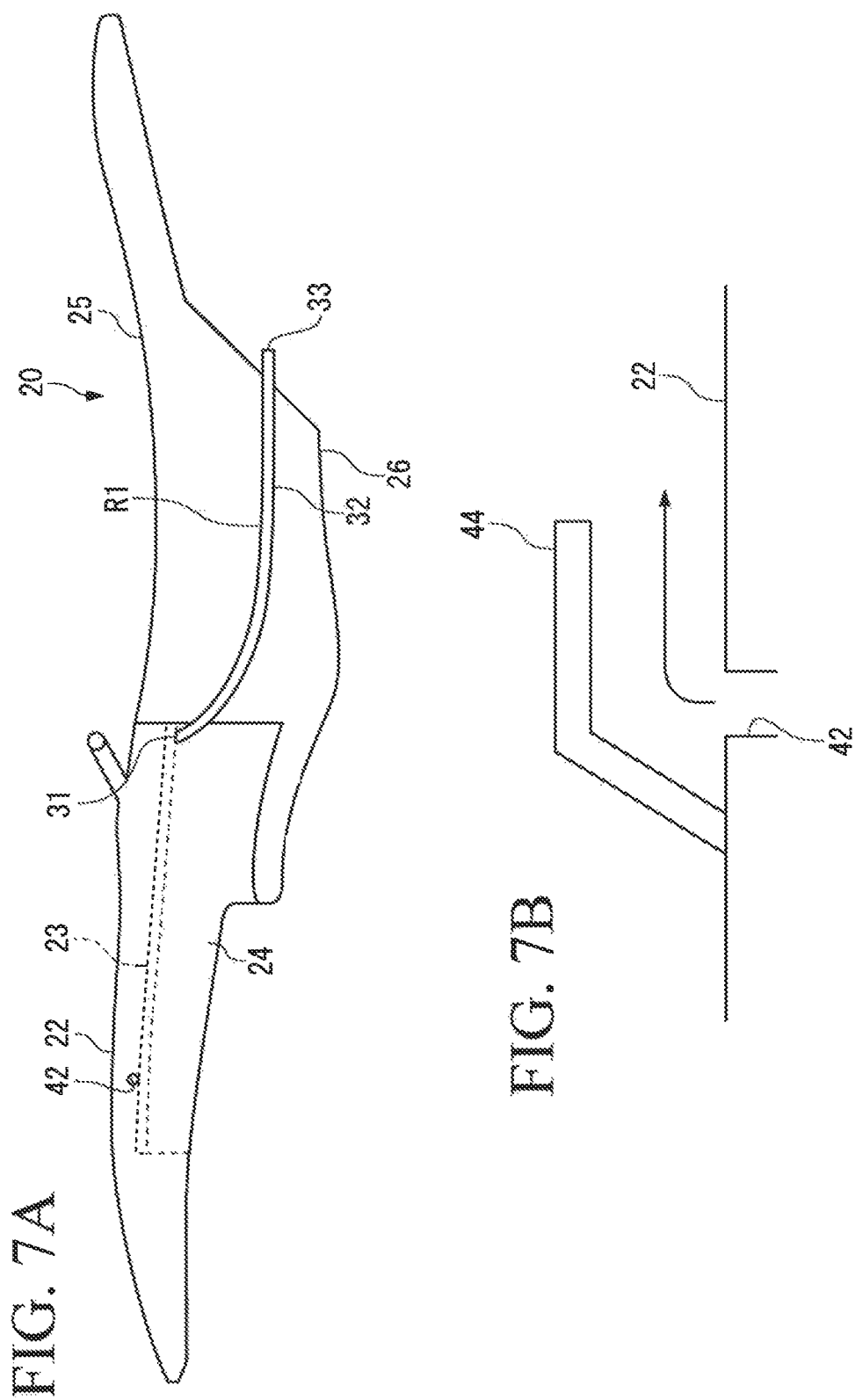

ENGINE PYLON HAVING A DRAIN

BACKGROUND OF THE INVENTION

Field of the Invention

The present invention relates to an engine pylon of an aircraft and an aircraft.

Description of the Related Art

An engine of aircraft is supported on a main wing via a pylon.

A fuel pipe that supplies fuel stored in an inner portion of the main wing to the engine is provided inside the pylon (for example, JP No. 2013-540941A). A pipe that supplies bleed air from the engine to an onboard air conditioner or the like, a hydraulic pipe that supplies hydraulic oil pressurized by the engine to a hydraulic mechanism, various electrical lines or the like are also provided inside the pylon.

Here, if the fuel leaks from the fuel pipe or the hydraulic oil leaks from the hydraulic pipe, there is a risk that the fuel or the hydraulic oil is vaporized and heated by the extraction steam pipe to ignite. There is also a risk that flammable vapor produced by the vaporization of the fuel or the hydraulic oil is ignited by a spark produced by short-circuiting of a connector of the electrical line.

Therefore, ignition in the pylon is prevented by ventilating the inside of the pylon in which the flammable vapor exists, discharging the flammable vapor together with air, and also discharging the leaked fuel or hydraulic oil to outside of the pylon from a drain.

The drain and ventilation structure of the pylon plays an important role in preventing the outbreak of a fire in an airframe through the fuel pipe or the like, and is thus indispensable. Therefore, a conventional structure has been repeatedly employed.

That is, two ventilation ducts that allow air to enter and exit from the pylon, and a drain that discharges the leaked fuel or hydraulic oil are provided in the pylon.

An object of the present invention is to provide an engine pylon of an aircraft and an aircraft, capable of achieving a weight reduction, which is a most important issue in the aircraft, and also capable of achieving an improvement in flight performance while securing prevention of ignition in the pylon by reconsidering a drain and ventilation structure provided in the pylon.

SUMMARY OF THE INVENTION

The present invention is a pylon that is used for supporting an engine of an aircraft on a main wing, the pylon including: a first drain that discharges a flammable liquid leaking from a pipe provided within a predetermined region in the pylon into outside air from inside of the region; and a ventilation path that brings the inside of the region into communication with outside air.

In accordance with the present invention, the first drain can be also used as a ventilation path. Since ventilation can be performed when there are two ventilation paths, it is possible to reliably ventilate the predetermined region in the pylon to reliably discharge flammable vapor together with air by the two ventilation paths: the first drain and the ventilation path.

When the first drain is also used as the ventilation path, it is not necessary to form one of the two ventilation paths for performing the ventilation.

Therefore, a duct necessary for forming the ventilation path, and a member or a device provided together with the duct can be eliminated, and the weight of an airframe can be correspondingly reduced.

Also, when the number of the ventilation paths is decreased, air resistance caused by an opening of the ventilation path facing outside air is reduced. Thus, the pylon has better aerodynamic performance, resulting in an improvement in the flight performance of the aircraft.

In accordance with the present invention, the flammable liquid and the flammable vapor can be reliably discharged into outside air by the ventilation path and the first drain, so that ignition in the predetermined region of the pylon can be reliably prevented.

Moreover, since the first drain is also used as the ventilation path, the weight of the aircraft can be reduced, and the flight performance can be improved.

The engine pylon of the present invention includes: a pylon body; and a pylon fairing that covers the pylon body, and it preferable that the ventilation path has a ventilation port that is opened to outside air in a side surface of the pylon fairing, and a tube that is connected to the ventilation port and extends within the region.

Outside air introduced from the ventilation port flows into the region through the tube. The outside air then moves toward the first drain from a distal end of the tube. The air enters and exits from the ventilation port according to an airflow.

When the ventilation path includes the tube, propagation of a flame is suppressed within the tube even if a flame arising from the engine or the like enters the ventilation port. Since the tube is cooled by low-temperature outside air, the propagation of the flame can be also suppressed with the energy of the flame drawn by the tube.

It is thus not always necessary to install a flame prevention member such as a flame arrester at the ventilation port.

In the engine pylon of the present invention, the ventilation port is preferably be located on a rear end side of the region, and the tube preferably extends forward within the region.

Accordingly, the length of the tube can be ensured, and flame propagation suppressing capacity obtained by the tube can be improved.

In a case in which the above configuration is employed, the outside air flowing into the region from the distal end of the tube can be moved over the entire region when the first drain is located on the rear end side of the region. Thus, ventilation capacity can be improved.

The ventilation port may be located on a front end side of the region, and the tube may extend backward within the region oppositely to the above configuration. The same effect can be thereby obtained.

Preferably, the engine pylon of the present invention further includes a second drain that discharges the flammable liquid into outside air from the inside of the region.

Accordingly, since the flammable liquid can be captured by both the first drain and the second drain, the flammable liquid can be more reliably discharged into outside air regardless of the attitude of the airframe.

In order to respond to a wide range of attitudes possibly assumed by the airframe, the first drain and the second drain are preferably located away from each other in a longitudinal direction. For example, the first drain may be arranged on the rear end side of the region, and the second drain may be arranged on the front end side of the region.

In the present invention, an independent compartment independent of the region, through which the pipe provided in the region does not pass, is preferably provided between a fire compartment including the engine and a peripheral region of the engine, and the region.

Accordingly, even when a fire breaks out from the engine, and a flame passes through the fire compartment of the engine, the flame can be kept within the independent compartment. Thus, it is possible to prevent the fire from spreading to the airframe through the pipe with the flame reaching the predetermined region of the pylon in which the pipe of the flammable liquid is provided.

An aircraft of the present invention includes the aforementioned engine pylon.

Accordingly, the same operation and effect as those described above can be produced.

In accordance with the present invention, it is possible to achieve a weight reduction, which is a most important issue in the aircraft, and also achieve an improvement in flight performance while securing prevention of ignition in the pylon.

BRIEF DESCRIPTION OF THE DRAWINGS

FIG. 6A is an upper view of the pylon; and FIG. 6B is a side view of the pylon; and FIGS. 7A and 7B show a modification of the present invention: FIG. 7A is a side view of a pylon; and FIG. 7B is a view illustrating a ventilation port.

DETAILED DESCRIPTION OF THE PREFERRED EMBODIMENTS

In the following, embodiments of the present invention are described by reference to the accompanying drawings.

First Embodiment

Figure 1:
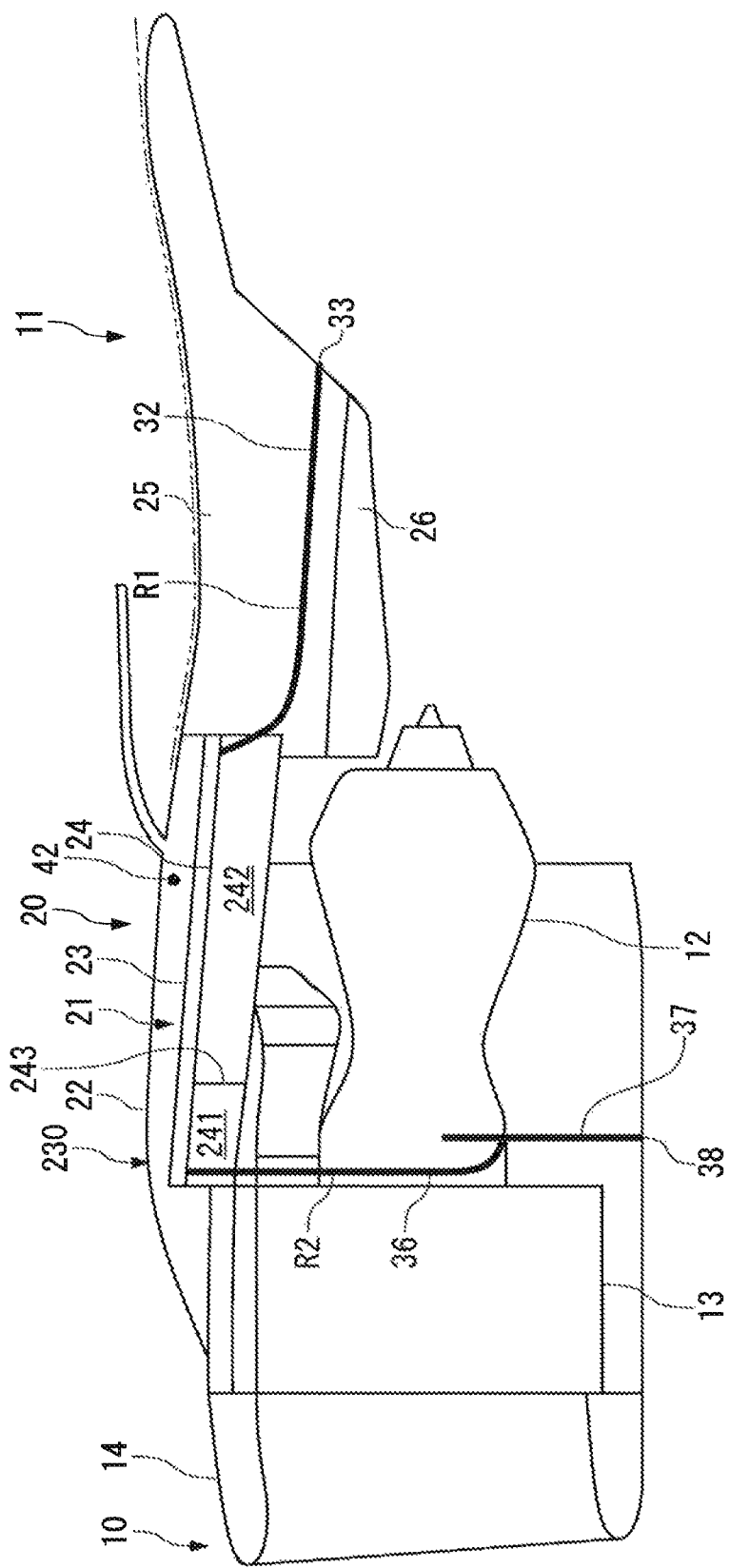
FIG. 1 is a schematic view illustrating a schematic configuration of a turbofan engine and an engine pylon of an aircraft according to a first embodiment of the present invention.

An aircraft according to an embodiment of the present invention includes a turbofan engine 10 shown in FIG. 1.

The turbofan engine 10 is supported on a lower side of a main wing 11 (only a lower surface of which is indicated by an alternate long and two short dashes line) via a pylon 20.

An inner portion of the main wing 11 is used as a fuel tank, and fuel is stored therein. The stored fuel is supplied to the turbofan engine 10 by a fuel pipe that is passed through the inside of the pylon 20.

The turbofan engine 10 includes an engine body 12, a fan 13 that is arranged ahead of the engine body 12, a nacelle 14 that constitutes an outer shell of the turbofan engine 10, and a core cowl (not shown) that is arranged on an inner side of the nacelle 14.

The engine body 12 includes a low-pressure compressor, a high-pressure compressor, a combustion chamber, a high-pressure turbine, and a low-pressure turbine although the constituent elements are not shown in the drawings.

The engine body 12 is equipped with engine accessories such as a fuel control unit, an ignition unit, a generator, and a plurality of heat exchangers, and pipes, lines, sensors, valves, actuators etc. accompanying the accessories.

A compartment including the engine body 12 and a peripheral region of the engine body 12 where the accessories are arranged (the inside of the core cowl) is a fire compartment where appropriate action, such as injection of a fire extinguishing agent, is taken when the outbreak of a fire is detected.

The pylon 20 includes a pylon body 21 that is a primary structural member provided on the main wing 11, and a pylon fairing 22 that aerodynamically shapes the pylon body 21.

The pylon body 21 is a structural body whose entire schematic shape is a box-like shape having a rectangular shape in section, and is composed of a plurality of members. The pylon body 21 extends over the lower surface of the main wing 11 from a position ahead of the main wing 11.

The pylon body 21 includes an upper pylon 23 and a lower pylon 24 that project forward from a front spar of the main wing 11, and a rear upper pylon 25 and a rear lower pylon 26 that are provided on the lower side of the main wing 11. The pylons 23 to 26 respectively correspond to regions where different functions are required in the pylon body 21.

Note that the pylon body 21 may be separated into regions in any manner other than that in the present embodiment.

The upper pylon 23 and the lower pylon 24 are arranged to be inclined with respect to a horizontal direction such that a front end is located higher than a rear end.

The pylon fairing 22 covers from above the upper pylon 23 on a side ahead of the main wing 11, and extends to the position of the front spar of the main wing 11.

Figure 2A:
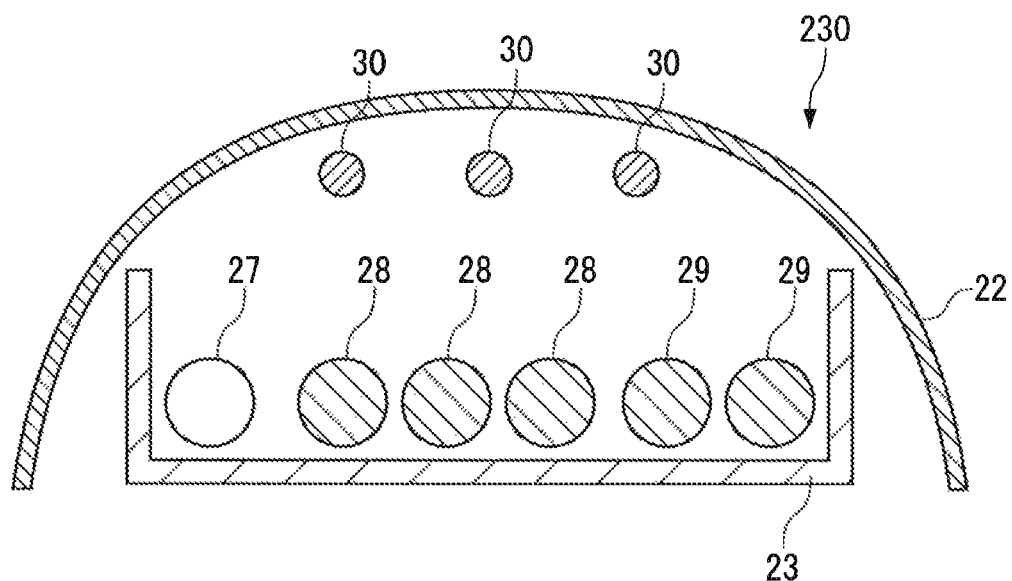
FIG. 2A is a sectional schematic view schematically illustrating a fuel pipe or the like that is accommodated in a case formed by an upper pylon and a pylon fairing.
Figure 3A:
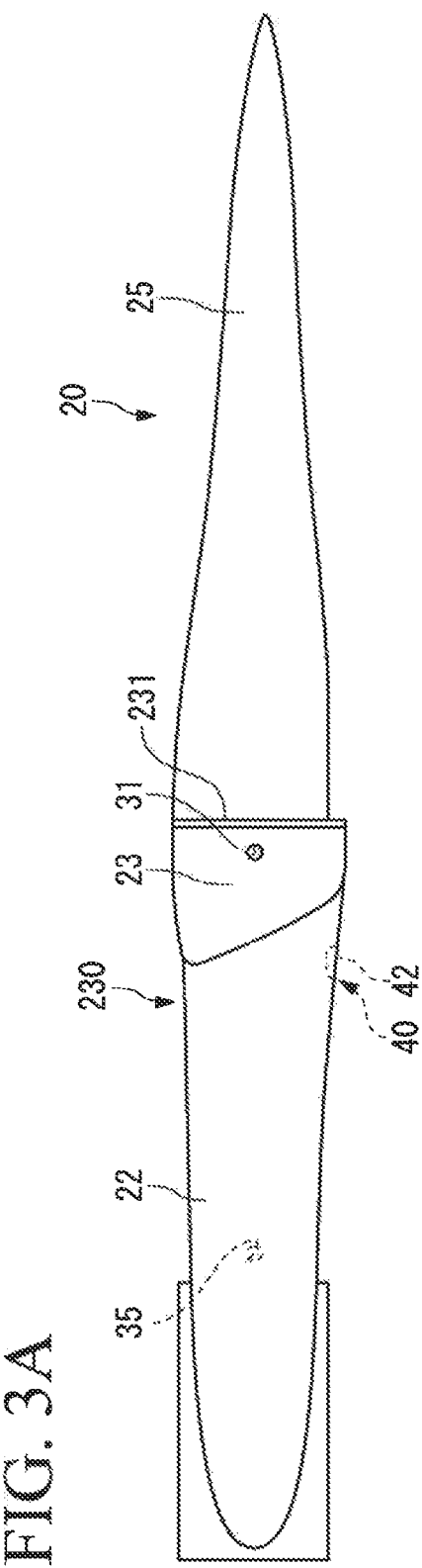
FIG. 3A is an upper view of the pylon.

The upper pylon 23 and the pylon fairing 22 constitute a pipe and line case (a predetermined region) 230 that accommodates pipes and lines as schematically shown in FIG. 2A. The pipe and line case 230 and the rear upper pylon 25 are separated by a bulkhead 231 (FIG. 3A).

A fuel pipe 27, hydraulic pipes 28, and extraction steam pipes 29 are provided in a lower portion within the pipe and line case 230. A plurality of electrical lines 30 used for FADEC (full authority digital engine control) are also provided in an upper portion within the pipe and line case 230.

The fuel pipe 27 supplies the fuel stored in the inner portion of the main wing 11 to the engine body 12 as described above.

The plurality of hydraulic pipes 28 including a supply line and a return line are provided so as to supply a pressure created by the engine body 12 to a fuel pump, an actuator of a flight control surface, or the like.

The extraction steam pipes 29 supply bleed air removed from the engine body 12 to a use destination such as an air conditioner of an airframe and an ice protection system of the engine. A surface temperature of the extraction steam pipe 29 through which the high-temperature and high-pressure bleed air flows is lowered by coating the pipe 29 with a resin member. However, the resin member is not provided on a connection portion between pipes that constitute the extraction steam pipe 29, so that a high-temperature surface is exposed.

Here, there is a risk that the fuel leaks from a connection portion or the like of the fuel pipe 27, or hydraulic oil leaks from a connection portion or the like of the hydraulic pipe 28 within the pipe and line case 230. The fuel and the hydraulic oil are collectively referred to as a flammable liquid.

Also, there exist elements that cause ignition (referred to as ignition sources), such as the extraction steam pipes 29 in which the surface of the connection portion has a high temperature, and electrical connectors (not shown) of the electrical lines, within the pipe and line case 230.

Accordingly, when the flammable liquid is vaporized, and flammable vapor produced by the vaporization is heated by the extraction steam pipes 29 to ignite, or is ignited by a spark produced by short-circuiting of the electrical connectors, a fire could be caused in the airframe through the fuel pipe 27 or the like.

Thus, ignition must not occur in the pipe and line case 230, and it is necessary to reliably prevent the ignition. A structure employed for the pylon 20 for this purpose is described later.

Even when flame-retardant hydraulic oil is used, there is also a risk of ignition depending on a temperature or a leakage amount.

The flammable liquid in the present specification means a liquid possibly igniting or being ignited regardless of combustibility.

The lower pylon 24 located below the upper pylon 23 is formed in a box-like shape having a rectangular shape in section. The inside of the lower pylon 24 is separated into a front-end region 241 located at a front end, and a fire-prevention region (an independent compartment) 242 located behind the front-end region 241.

The pipes 27 to 29 and the lines 30 provided in the pipe and line case 230 pass through the front-end region 241 to be connected to respective ports of the engine body 12.

Ignition in the front-end region 241 is prevented by not providing joints of the pipes 27 to 29 and the electrical connectors of the lines 30, which serve as the ignition sources, in the front-end region 241. Therefore, it is not necessary to provide a ventilation structure in the front-end region 241. A drain (not shown) is provided in the front-end region 241 such that the lower pylon 24 is not damaged with an excessive pressure applied thereto when a large amount of flammable liquid leaks from a pipe.

The fire-prevention region 242 is partitioned from the front-end region 241 by a bulkhead 243. The fire-prevention region 242 is also partitioned from the pipe and line case 230, the rear upper pylon 25, and the rear lower pylon 26 by side walls of the lower pylon 24 and an unillustrated bulkhead.

Combustible members, e.g., pipes and lines are not provided in the fire-prevention region 242.

Even when a fire breaks out from the engine body 12, and a flame passes through the fire compartment of the engine body 12, a risk that the flame reaches the inside of the pipe and line case 230 where the flammable vapor and the ignition sources exist can be suppressed because of the existence of the fire-prevention region 242 that occupies a large portion of the lower pylon 24.

The pipes 27 to 29 and the lines 30 provided in the pipe and line case 230 do not pass through the fire-prevention region 242, and the fire-prevention region 242 is a compartment independent of the inside of the pipe and line case 230. Thus, the fire-prevention region 242 keeps the flame arising from the engine body 12 within its compartment without causing the flame to reach the inside of the pipe and line case 230. Accordingly, the fire is prevented from spreading to the main wing 11 through the pipes and the lines in the pipe and line case 230 from the engine body 12.

The rear upper pylon 25 is provided along the lower surface of the main wing 11.

The rear lower pylon 26 is provided on a lower side of the rear upper pylon 25, and is located behind an exhaust nozzle of the engine body 12.

In the following, the structure for preventing the ignition within the pipe and line case 230 is described.

In order to prevent the ignition within the pipe and line case 230 where the flammable vapor and the ignition sources exist, it is required to discharge the leaked flammable liquid to outside of the pipe and line case 230, and to perform ventilation to discharge the flammable vapor to outside of the pipe and line case 230 together with air.

First, a configuration for discharging the flammable liquid and an operation thereof are described.

Figure 3B:
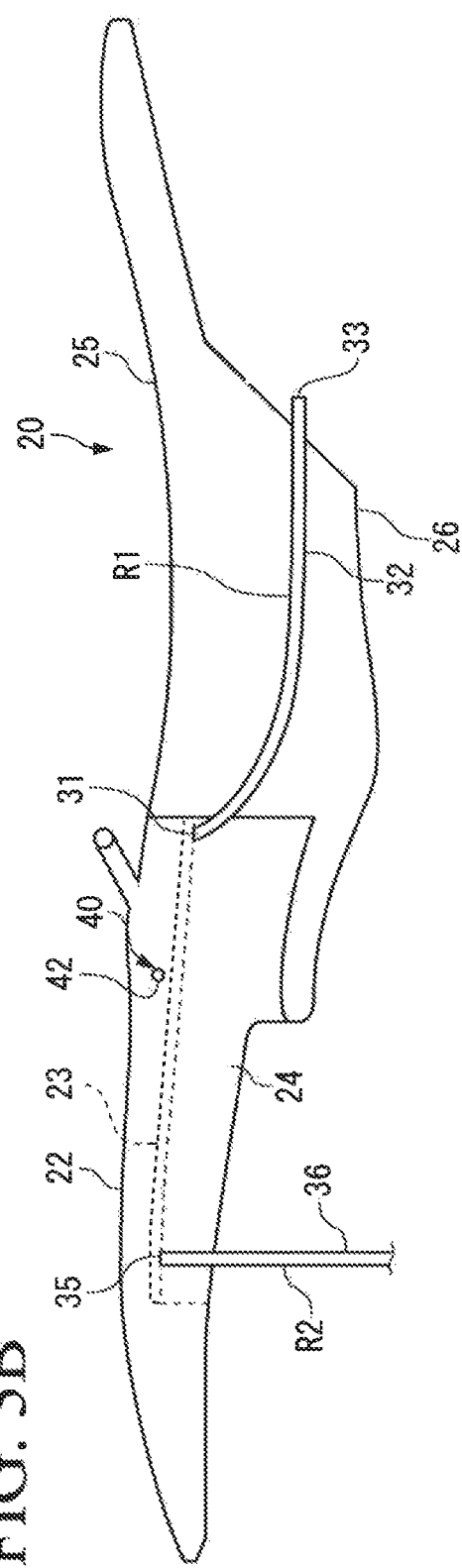
FIG. 3B is a side view of the pylon.

As shown in FIGS. 3A and 3B, a first drain R1 that discharges the flammable liquid is provided at a rear end portion of the upper pylon 23.

The first drain R1 has a first drain port 31 that is located at the rear end portion of the upper pylon 23, and a first drain pipe 32 that is connected to the first drain port 31.

The first drain pipe 32 is extended to a rear end of the rear lower pylon 26 through the rear upper pylon 25.

Since the upper pylon 23 is inclined, the flammable liquid leaking from the fuel pipe 27 or the hydraulic pipes 28 is accumulated on the rear end side of the upper pylon 23, and flows into the first drain port 31. The flammable liquid passes through the first drain pipe 32, and is discharged into outside air from a first outlet 33 located at a rear end of the first drain pipe 32.

When the aircraft is parking or cruising in the sky in a horizontal state, ascending with the nose up, or flying with the nose down up to a certain degree, the flammable liquid is discharged to outside of the pylon 20 through the first drain R1.

By the way, in some cases, the aircraft assumes an attitude in which the nose is substantially down in order to rapidly reduce the altitude when the aircraft is descending in emergency at the time of a trouble in the engine or the airframe. In this case, if a pipe is damaged with a fragment of an engine part or the like colliding with the pipe, the flammable liquid flows out of the pipe, and is accumulated on a front end side of the upper pylon 23.

To discharge the flammable liquid, a second drain R2 is provided at a front end portion of the upper pylon 23. The second drain R2 can discharge the flammable liquid to outside of the pylon 20 even when the aircraft is descending in emergency.

The second drain R2 has a second drain port 35 that is located at the front end portion of the upper pylon 23, a second drain pipe 36 that is connected to the second drain port 35, and a drain pipe 37 (FIG. 1) that is connected to the second drain pipe 36.

The second drain pipe 36 passes through the front-end region 241, and is extended to the outer periphery of the engine body 12. The second drain pipe 36 is connected to the other drain pipe 37 that communicates with the outside of the nacelle 14 from a lower side of the engine body 12.

The flammable liquid accumulated on the front end side of the upper pylon 23 flows into the second drain port 35 when the aircraft is descending in emergency. The flammable liquid passes through the second drain pipe 36 and the drain pipe 37, and is discharged into outside air from a second outlet 38 that is located at a lower end of the drain pipe 37. The second outlet 38 (FIG. 1) is exposed on the outer periphery of the nacelle 14.

Which of the first drain R1 and the second drain R2 the flammable liquid leaking from the pipe passes through to be discharged depends on a position where the flammable liquid leaks, and an accumulated state within the pipe and line case 230 in addition to the airframe attitude. In some cases, the flammable liquid is discharged through both the first drain R1 and the second drain R2.

For example, when the flammable liquid leaks at the front end of the upper pylon 23 or the rear end of the upper pylon 23, at least one portion of the leakage amount is discharged from the drain port (31 or 35) close to the leakage position regardless of the airframe attitude.

An entire amount of the leaked flammable liquid does not always flow to the front end side or the rear end side of the upper pylon 23 due to a difference in level of members located within the pipe and line case 230. Thus, the flammable liquid may be discharged through both the first drain R1 and the second drain R2.

As described above, since the flammable liquid is captured by the two drains R1 and R2, the flammable liquid can be reliably discharged into outside air.

Next, a configuration for discharging the flammable vapor and an operation thereof are described.

Ventilation of the inside of the pipe and line case 230 is performed by use of an airflow generated around the aircraft during a flight.

In the present embodiment, a ventilation path 40 that communicates with the inside of the case 230 and is opened to outside air is provided in the upper pylon 23 and the pylon fairing 22 that covers the upper pylon 23.

Figure 2B:
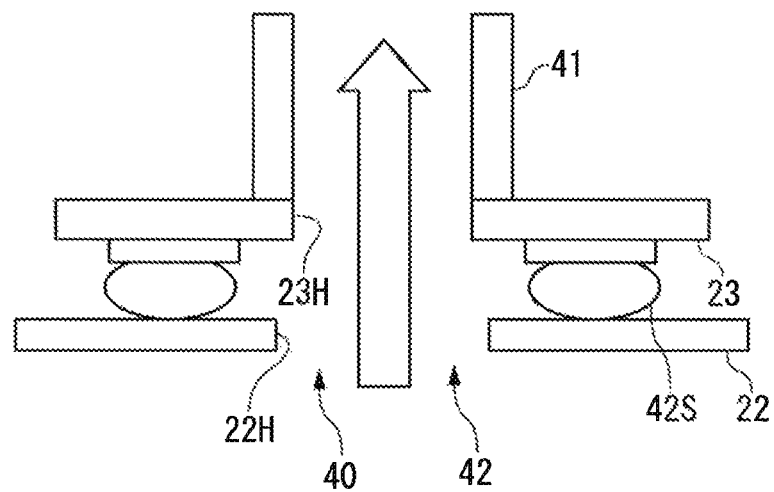
FIG. 2B is a sectional view of a ventilation port.

As shown in FIG. 2B, the ventilation path 40 has a duct 41 that communicates with the inside of the case 230, and a ventilation port 42 that is located on an outside air side of the duct 41.

The ventilation port 42 is composed of a through hole 22H that is formed in the pylon fairing 22, a through hole 23H that is formed in the upper pylon 23, and a seal member 42S that seals a gap between the pylon fairing 22 and the upper pylon 23. The through holes 22H and 23H have the same diameter. The ventilation port 42 is located between the first drain port 31 and the second drain port 35 in a longitudinal direction, and is formed in a size of, for example, about several cm.

Here, as a typical example of a pylon ventilation structure, a ventilation path having a so-called NACA scoop (indicated by an alternate long and two short dashes line in FIG. 4) is provided in the pylon fairing 22. Another ventilation path is also provided at a position behind the ventilation path. Accordingly, two ventilation paths are prepared.

In the present embodiment, however, only one ventilation path 40 is provided, and the first drain port 31 and the second drain port 35 are also used as ventilation paths.

Figure 4:
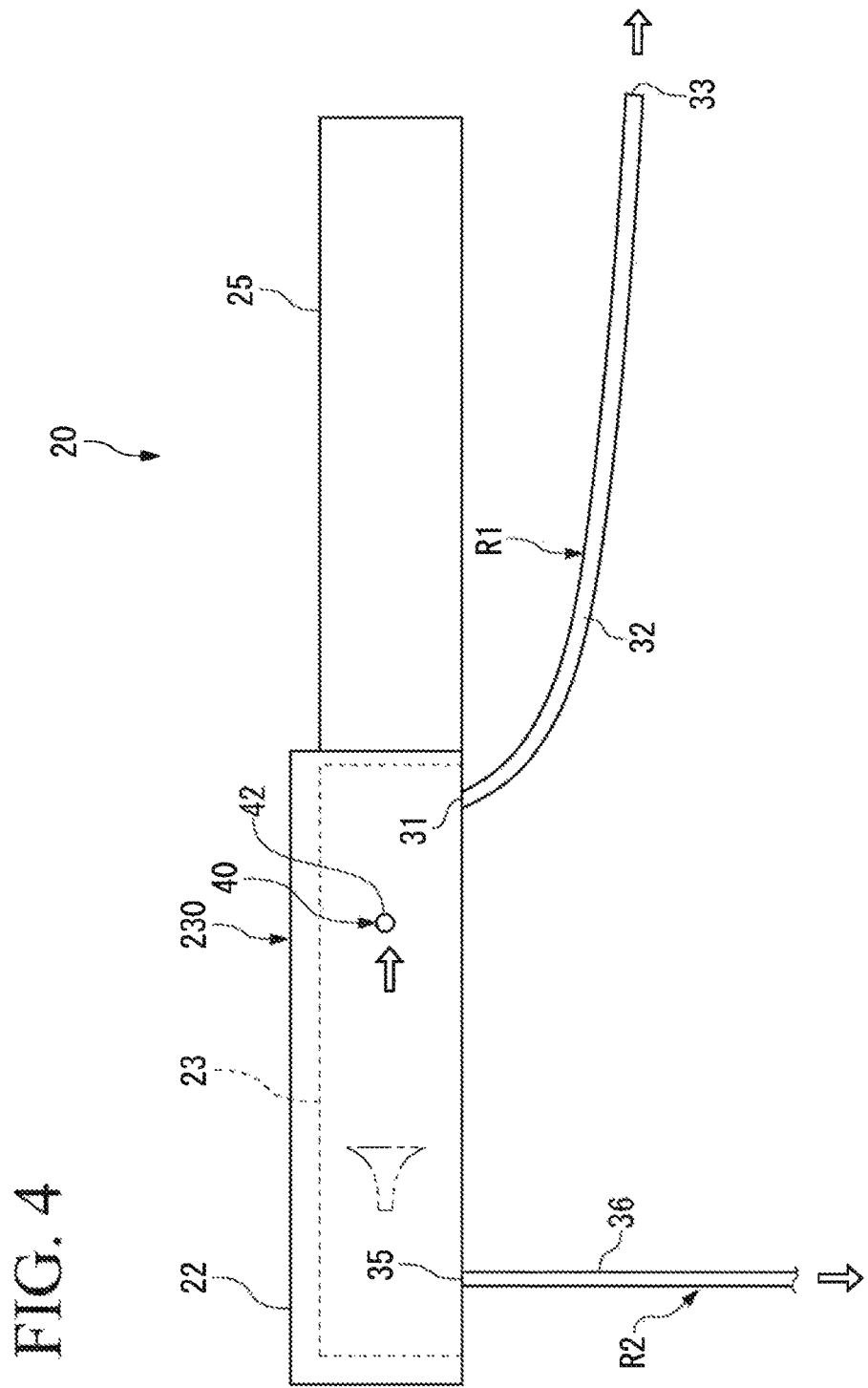
FIG. 4 is a view for explaining a ventilation structure in the pylon.

As shown in FIG. 4, when air is introduced into the pipe and line case 230 by the ventilation path 40, the air moves within the pipe and line case 230, and is discharged through one or both of the first drain R1 and the second drain R2 according to a pressure distribution. The flammable vapor existing in the pipe and line case 230 is discharged into outside air along with the flow of the air.

In an example shown in FIG. 4, the ventilation path 40 serves as a ventilation inlet, and the first drain R1 and the second drain R2 serve as ventilation outlets. However, a relationship between the ventilation inlet and the ventilation outlet may be optionally changed among the ventilation path 40, the first drain R1, and the second drain R2 depending on a pressure variation of outside air. For example, the second drain R2 may work as the ventilation inlet, and the ventilation path 40 and the first drain R1 may work as the ventilation outlets.

In the present embodiment, the three elements: the ventilation path 40, the first drain R1, and the second drain R2 are prepared as the ventilation inlet and outlet. Thus, as compared with a case in which only two ventilation paths are prepared, or one ventilation path and one drain are prepared, a sufficient air motion can be generated from the ventilation inlet to the ventilation outlet.

When there are three openings that can be used as the ventilation paths as in the present embodiment, the sufficient air motion can be generated to perform the ventilation by ensuring a pressure gradient from the ventilation inlet toward the ventilation outlet in response to a wider range of flight conditions and atmospheric pressure conditions.

Also, even while the flammable liquid is being discharged from one of the first drain R1 and the second drain R2, the ventilation can be ensured by the other drain and the ventilation path 40. Thus, the flammable vapor can be rapidly discharged without waiting for completion of the discharge of the flammable liquid.

As described above, since the first drain R1 and the second drain R2 can be also used as the ventilation paths, the inside of the pipe and line case 230 can be sufficiently ventilated. Thus, it is not necessary to form a ventilation path (for example, the ventilation path indicated by the alternate long and two short dashes line in FIG. 4) paired with the ventilation path 40.

Therefore, a duct necessary for forming the ventilation path, and a member or a device provided together with the duct can be eliminated, and the weight of the airframe and the cost can be correspondingly reduced.

Moreover, when the number of the ventilation paths is decreased, air resistance caused by the ventilation port is reduced. Thus, the pylon 20 has better aerodynamic performance, resulting in an improvement in the flight performance of the aircraft.

As described above, in accordance with the present embodiment, the flammable liquid and the flammable vapor can be reliably discharged to outside of the pylon 20 by the ventilation path 40 and the first and second drains R1 and R2, so that the ignition in the pylon 20 can be reliably prevented.

Moreover, since the first and second drains R1 and R2 are also used as the ventilation paths, the weight of the aircraft can be reduced, and the flight performance can be improved.

The forms and the positions of the first and second drains R1 and R2 may be optionally determined by a test or the like performed by allowing a liquid simulating the flammable liquid leaking from the pipe to flow and checking its discharge state.

Also, the form and the position of the ventilation path 40 may be optionally determined by estimating a ventilation state based on analysis using a flight envelope.

Routes in which the first and second drains R1 and R2 are extended are determined in consideration of a pipe installation space as well such that the routes have a shortest possible distance in view of a weight reduction.

In the above embodiment, by using the first drain pipe 32, the flammable liquid discharged to outside of the case 230 from the first drain port 31 can be guided to a position behind the engine and discharged without adhering to the pylon 20, the engine accessories, and the core cowl around the engine body 12.

Also, by using the second drain pipe 36, the flammable liquid discharged to outside of the case 230 from the second drain port 35 can be guided to a position below the engine and discharged without adhering to the pylon 20, the engine accessories, and the core cowl around the engine body 12.

However, depending on the positions of the first and second drain ports 31 and 35, and the layout of the engine members, it may not be necessary to prevent the adhesion of the flammable liquid, or the adhesion of the flammable liquid may be allowed even when the flammable liquid is directly discharged from the first and second drain ports 31 and 35.

Therefore, in the present invention, the drain pipes 32, 36, and 37 are not indispensable.

Second Embodiment

Next, a second embodiment of the present invention is described by reference to FIGS. 5 and 6A, 6B.

In the second embodiment, differences from the first embodiment are mainly described. The same components as those of the configuration of the first embodiment are assigned the same reference numerals.

Figure 5:
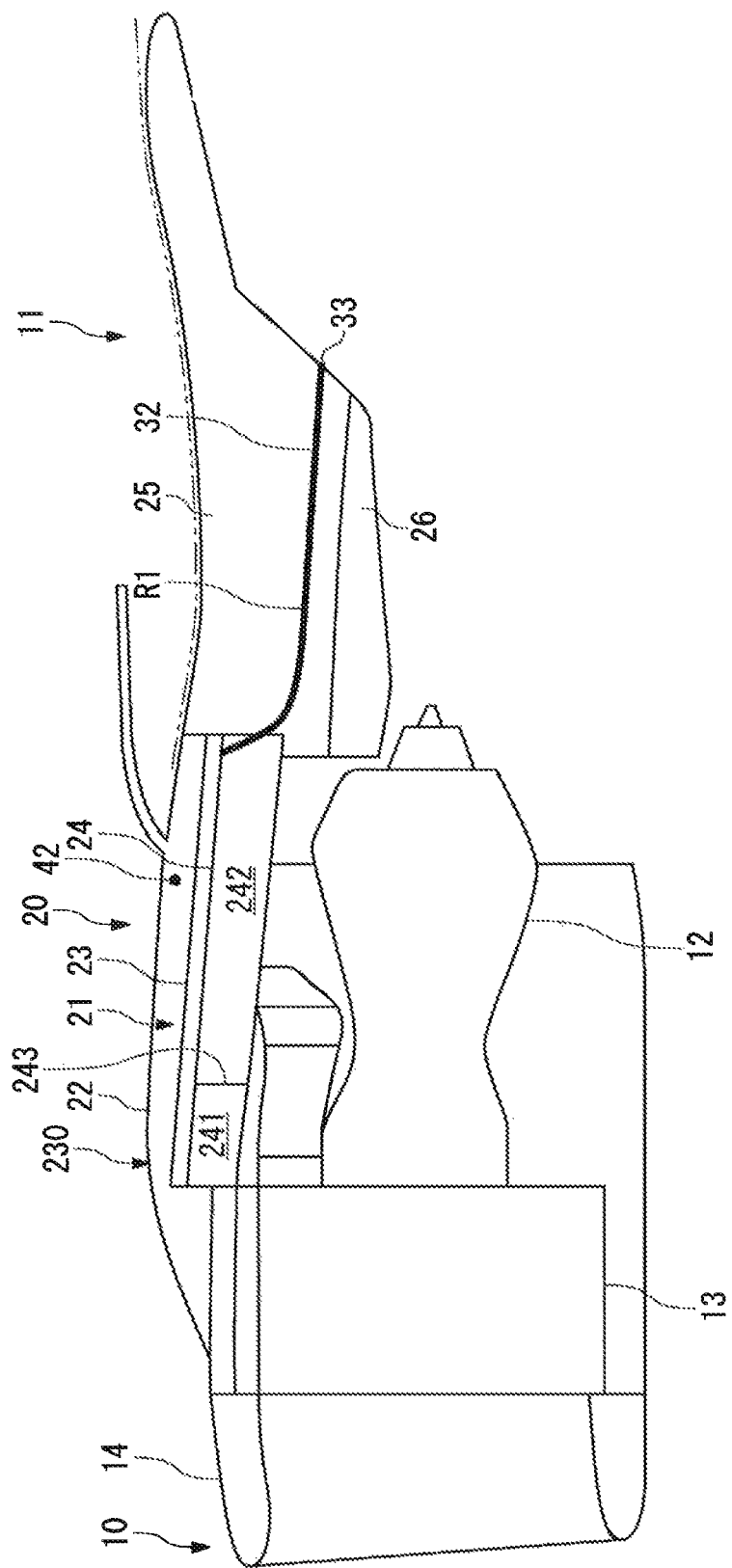
FIG. 5 is a schematic view illustrating a schematic configuration of a turbofan engine and an engine pylon of an aircraft according to a second embodiment of the present invention.

As shown in FIG. 5, the engine pylon 20 of the second embodiment does not include the second drain R2 (FIG. 1) that is provided in the first embodiment.

Therefore, only two elements: the ventilation path 40 and the first drain R1 are provided as an outlet and an inlet through which a fluid can enter and exit from the pipe and line case 230.

In the present embodiment, a path exclusive for ventilation that is paired with the ventilation path is omitted, and the first drain R1 is also used as a ventilation path. Accordingly, the same effects as those of the first embodiment can be obtained.

The present embodiment further has a feature in the structure of the ventilation path 40.

The ventilation path 40 has the ventilation port 42 that is opened to outside air, and a tube 43 that is connected to the ventilation port 42 as shown in FIGS. 6A and 6B.

The ventilation port 42 is provided in a side surface of the pylon fairing 22.

The tube 43 extends forward within the pipe and line case 230 as shown in FIG. 6A in which the pylon fairing 22 is shown in a broken manner. A distal end of the tube 43 is located close to a front end of the pipe and line case 230.

Outside air introduced from the ventilation port 42 flows into the pipe and line case 230 through the tube 43. The outside air then moves toward the first drain port 31 of the first drain R1 from the distal end of the tube 43 (see an arrow at the distal end of the tube 43).

When the ventilation path 40 includes the tube 43 as in the present embodiment, propagation of a flame is suppressed within the tube 43 even if a flame generated by a fire outside the parked aircraft or a fire breaking out from the engine 10 enters the ventilation port 42. Since the tube 43 is cooled by low-temperature outside air, the propagation of the flame can be also suppressed with the energy of the flame drawn by the tube 43.

Moreover, since the tube 43 extends forward within the pipe and line case 230 from the ventilation port 42 that is located on a rear end side of the pipe and line case 230, the tube 43 can be ensured to have a length enough to ensure sufficient flame propagation suppressing capacity.

The ventilation path 40 in the first embodiment may also include the tube 43.

As shown in FIGS. 7A and 7B, the ventilation port 42 may be located on the front end side of the pipe and line case 230. The tube 43 (FIGS. 6A and 6B) is not connected to the ventilation port 42 shown in FIGS. 7A and 7B.

In this case, it is preferable to provide a shielding plate 44 that extends to the front of the ventilation port 42 from a position ahead of the ventilation port 42. Air can pass through a space between the shielding plate 44 and the pylon fairing 22.

It is possible to prevent the entrance of the flame arising from the turbofan engine 10 into the ventilation port 42 by the shielding plate 44.

The positions or the forms of the ventilation paths and the drains may be also modified variously.

As long as the inside of the region to be ventilated can communicate with outside air, the ventilation path may be provided behind the position in each of the above embodiments.

The constitutions described in the aforementioned embodiments may be also freely selected or changed into other constitutions without departing from the gist of the present invention.

What is claimed is:

1. An engine pylon that is used for supporting an engine on a main wing, the engine pylon comprising:
a pylon body comprising at least an upper pylon and a lower pylon that project forward from a front spar of the main wing;
a pylon fairing that covers the pylon body, the pylon fairing and upper pylon of the pylon body defining a predetermined region of the engine pylon;
a first drain configured to discharge a flammable liquid leaking from a pipe provided within the predetermined region of the engine pylon into outside air from inside of the predetermined region; and
a ventilation path configured to bring the inside of the predetermined region into communication with the outside air,
wherein the ventilation path passes through the upper pylon and the pylon fairing that covers the pylon body,
wherein the first drain comprises a first drain port and a first drain pipe connected to the first drain port, and
wherein the first drain pipe extends in a rear direction from the first drain port and has an outlet at a rear end of the first drain pipe, the outlet being located past a rear end of the upper pylon and a rear end of the lower pylon.

2. The engine pylon according to claim 1, wherein the ventilation path has:
a ventilation port that is opened to the outside air in a side surface of the pylon fairing, and
a tube that is connected to the ventilation port and extends within the predetermined region.

3. The engine pylon according to claim 2,
wherein the ventilation port is located on a rear end side of the predetermined region, and
the tube extends forward within the predetermined region.

4. The engine pylon according to claim 1, further comprising
a second drain configured to discharge the flammable liquid into the outside air from the inside of the predetermined region.

5. The engine pylon according to claim 3, further comprising
a second drain configured to discharge the flammable liquid into the outside air from the inside of the predetermined region.

6. The engine pylon according to claim 1,
wherein an independent compartment, independent of the predetermined region and through which the pipe does not pass, is provided between the predetermined region and a fire compartment that includes the engine and a peripheral region of the engine.

7. The engine pylon according to claim 1,
wherein the predetermined region is a pipe and line case.

8. The engine pylon according to claim 1,
wherein the upper pylon and the lower pylon are arranged to be inclined with respect to a horizontal direction such that a front end of the upper pylon is located higher than a rear end of the upper pylon, and the front end of the lower pylon is located higher than the rear end of the lower pylon.

9. The engine pylon according to claim 8,
wherein the first drain is provided at a rear end portion of the upper pylon.

10. The engine pylon according to claim 9,
wherein the first drain port is located at the rear end portion of the upper pylon, and
at least a part of the flammable liquid is discharged into the outside air from the outlet located at the rear end of the first drain pipe.

11. The engine pylon of an aircraft according to claim 1,
wherein the first drain is configured to provide an additional ventilation path.

12. The engine pylon of an aircraft according to claim 4,
wherein the second drain is configured to provide an additional ventilation path.

13. The engine pylon according to claim 4, wherein the second drain is provided at a front end portion of the upper pylon.

14. The engine pylon according to claim 13,
wherein the second drain has at least a second drain port that is located at the front end portion of the upper pylon, and a second drain pipe that is connected to the second drain port.

15. The engine pylon according to claim 14,
wherein the second drain further comprises an additional drain pipe that is connected to the second drain pipe, and
at least a part of the flammable liquid is discharged into the outside air from a second outlet located at a lower end of the additional drain pipe.

16. An aircraft comprising the engine pylon according to claim 1.

17. An aircraft comprising the engine pylon according to claim 13.

18. The engine pylon according to claim 1, wherein the ventilation path passes through an aperture in the upper pylon and an aperture in the pylon fairing that covers the pylon body.

19. The engine pylon according to claim 1, wherein:
the predetermined region is a pipe and line case,
the pipe and a plurality of electrical lines are accommodated within the predetermined region, and
the lower pylon is arranged below the upper pylon and comprises a front-end region and a fire-prevention region partitioned from the front-end region by a bulkhead.

20. The engine pylon according to claim 19, wherein:
the pipe and plurality of electrical lines pass through the front-end region of the lower pylon, and
no pipes and electrical lines are provided in the fire-prevention region of the lower pylon.

21. An engine pylon that is used for supporting an engine on a main wing, the engine pylon comprising:
a pylon body comprising an upper pylon and a lower pylon that project forward from a front spar of the main wing, wherein the lower pylon is arranged below the upper pylon and comprises a front-end region and a fire-prevention region partitioned from the front-end region by a bulkhead;
a pylon fairing that covers the pylon body, the pylon fairing and upper pylon of the pylon body collectively forming a predetermined region of the engine pylon;
a pipe and a plurality of electrical lines provided within the predetermined region,
a first drain configured to discharge a flammable liquid leaking from the pipe into outside air; and
a ventilation path passing through the upper pylon and the pylon fairing that is configured to bring an inside of the predetermined region into communication with the outside air.

22. An engine pylon that is used for supporting an engine on a main wing, the engine pylon comprising:
a pylon body comprising:
a front pylon body comprising an upper-front pylon and a lower-front pylon that project forward from a front spar of the main wing, and
a rear pylon body arranged behind the front pylon body and comprising an upper-rear pylon and a lower-rear pylon;
a pylon fairing that covers the pylon body, the pylon fairing and upper front pylon of the pylon body defining a predetermined region of the engine pylon;
a drain configured to discharge a flammable liquid leaking from a pipe provided within the predetermined region of the engine pylon into outside air from inside of the predetermined region; and
a ventilation path configured to bring the inside of the predetermined region into communication with the outside air,
wherein the ventilation path passes through the upper-front pylon and the pylon fairing that covers the pylon body,
wherein the drain comprises a drain port and a drain pipe connected to the drain port, and
wherein the drain pipe extends in a rear direction from the drain port and has an outlet at a rear end of the drain pipe, the outlet being located at a rear end portion of the rear pylon body.

23. The engine pylon according to claim 22, wherein the outlet of the drain pipe is located a past rear end of the lower-rear pylon body.

* * * * *